Figure 1:
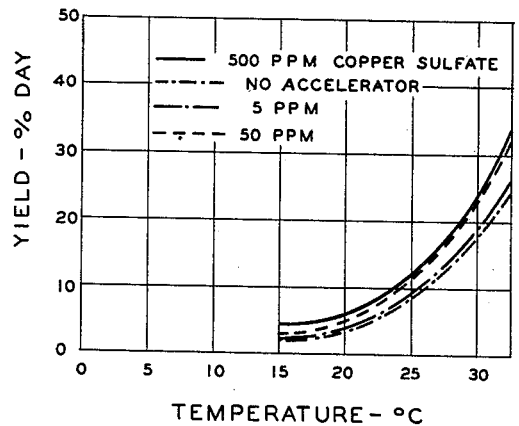

Jan. 14, 1958    H. J. PASSINO ET AL    2,820,026

MANUFACTURE OF FLUORINE CONTAINING POLYMERS

Filed June 11, 1953

POLYMERIZATION OF $CF_2=CClF$ USING PERSULFATE-BISULFITE (0.074 MOLAR)

INVENTORS
HERBERT J. PASSINO
JOHN M. WRIGHTSON
ALBERT L. DITTMAN

BY

ATTORNEYS

United States Patent Office 2,820,026
Patented Jan. 14, 1958

2,820,026

MANUFACTURE OF FLUORINE CONTAINING POLYMERS

Herbert J. Passino, Englewood, and Albert L. Dittman, North Bergen, N. J., and John M. Wrightson, Whittier, Calif., assignors, by mesne assignments, to Minnesota Mining and Manufacturing Company, St. Paul, Minn., a corporation of Delaware Application June 11, 1953, Serial No. 360,892

13 Claims. (Cl. 260—92.1)

This invention relates to a method of manufacturing fluorinated plastics. In one of its aspects, this invention relates to a method for polymerizing fluorochloroolefins to produce a normally solid polymer. In another of its aspects, this invention relates to the polymerization of perfluorochloroolefins in an aqueous-suspension medium to produce a normally solid polymer. In one of its more particular aspects, this invention relates to the polymerization of trifluorochloroethylene in a persulfatebisulfite promoted aqueous system accelerated with copper ion to produce a normally solid thermoplastic polymer.

The present invention is a continuation-in-part of our prior and copending application Serial No. 213,524, filed March 2, 1952, and now Patent No. 2,689,241, which discloses polymerization of halogenated olefins in aqueous systems.

The polymerization of fluorochloroolefins results in the production of a variety of useful materials. For example, the polymerization of trifluorochloroethylene under conditions suitable for the production of the solid polymer yields a material of extraordinary chemical resistance and desirable physical characteristics. The chemical resistance of polytrifluorochloroethylene is such that it will withstand exposure to a wide variety of oxidizing, reducing and solvent type materials such as fuming nitric acid, hydrazine, acetone, aniline, etc. Physically, the material possesses high heat stability, tensile strength, etc. In addition to the above properties, these polymers are readily molded into various useful articles, such as valves, gaskets, diaphragms, etc., using conventional equipment with operating conditions adjusted in accordance with the characteristics of the polymer.

The present method for producing solid polytrifluorochloroethylene is by a bomb or mass-bulk type reaction at relatively low temperatures. The polymerization is effected, under suitable polymerization conditions, with or without the presence of a suitable catalyst or promoter. Such conditions comprise the use of a suitable catalyst, such as bis-trichloroacetyl peroxide dissolved in a suitable solvent, such as trichlorofluoromethane, at a temperature between about −20° C. and about 50° C. After a period of about 7 days the bomb is opened and a porous-plug containing monomer within the interstices of the plug is removed. The monomer is evaporated and the plug is broken into chips or granules for further processing.

It is an object of this invention to provide a process for polymerizing fluorochloroolefins, to produce polymer in relatively high yields.

Another object of this invention is to provide a process in which polymerization of fluorochloroolefins may be effected in relatively short periods of time and in good yields from an economic standpoint.

Another object of this invention is to provide an accelerator for increasing yields of polymer and decreasing the time of polymerization.

It is one of the more particular objects of this invention to provide a process for producing normally solid, thermoplastic polymers of trifluorochloroethylene having a no strength temperature above about 220° C. in high yields.

Various other objects and advantages of the present invention will become apparent to those skilled in the art from the accompanying description and disclosure.

As herein defined, polymerization refers to the polymerization of a single monomer and also to the copolymerization of unlike monomers to produce polymers and copolymers.

According to this invention, a substituted ethylene containing at least two fluorine atoms, preferably at least one fluorine atom per carbon atom of the aliphatic portion of the substituted ethylene, is polymerized in the presence of an aqueous-suspension medium under suitable conditions of temperature, pressure, residence time and promoting agent to produce a normally solid, thermoplastic polymer. The polymerization process of this invention may be effected in either a batchwise or continuous manner. The monomer is admixed with the aqueous-suspension medium in a suitable polymerization zone which is maintained at the appropriate conditions of polymerization and under sufficient pressure to maintain the aqueous solution as a liquid under the conditions of polymerization. The monomer and water are agitated by suitable means in the reaction zone so as to intimately disperse the monomer and aqueous-suspension medium. The monomer and polymer are substantially insoluble in the aqueous dispersion medium. The separation of the polymer from the water phase may be effected by settling and decantation, by filtering, by centrifuging, by evaporation, or by various other conventional methods.

The present invention is particularly applicable to the polymerization of perfluorochloroolefins, such as trifluorochloroethylene. However, the invention contemplates the polymerization of various halogenated olefins. For example, perfluorobutadiene, perfluoropropene, phenyltrifluoroethylene, alpha methyl phenyl difluoroethylene, perfluoro acrylonitrile, perfluorostyrene, perfluorocyclobutene, perfluorocyclobutadiene, tetrafluoroethylene, vinylidene fluoride, trifluoroethylene and difluorodichloroethylene. As previously mentioned, the invention applies to the copolymerization of these monomers as well as their homopolymerization. For example, the invention applies to the copolymerization of trifluorochloroethylene and tetrafluoroethylene, of trifluorochloroethylene and vinylidene fluoride, trifluorochloroethylene and vinyl fluoride, trifluorochloroethylene and vinyl chloride, trifluorochloroethylene and vinylidene chloride, trifluorochloroethylene and perfluoropropene, trifluorochloroethylene, and trifluoroethylene, and of perfluorobutadiene and perfluorostyrene. In these copolymerizations, the second monomer is also preferably a fluorinated olefin and preferably contains at least two fluorine atoms per molecule. When less than 5 weight percent comonomer is employed, the polymerization is broadly included within the term homopolymerization.

The quantity of water employed as the aqueous-suspension medium is usually between about 0.05 to about 10 times by volume of the quantity of total monomer present in the reaction zone. Preferably, the quantity of water is between one and five times the total monomer in the reaction zone.

The temperature employed for the polymerization will depend to a certain extent upon the particular monomer being polymerized. While the temperature may be varied depending upon the type of monomer, it is preferred that the temperature be maintained below about 40° C. Temperatures above 40° C. result in the production of non-thermoplastic polymers, i. e. waxes and oils, depending on the extent to which the temperature has been raised above 40° C. As the temperature is decreased the reaction time increases. Temperatures substantially below about 0° C. can not be used. Therefore, this invention contemplates the use of temperature above about 0° C. and below 40° C. In the polymerization of trifluorochloroethylene, temperatures between about 15° C. and about 30° C. are preferred. Still more preferable, are temperatures between about 15° C. and about 25° C. while a particularly suitable temperature is about 20° C. for the production of a high N. S. T. polymer of trifluorochloroethylene, i. e. polymer having an N. S. T. of about 310° C.

The time of polymerization also depends upon the monomer being polymerized, but usually will be between about 10 minutes and about 50 hours. A preferred polymerization time is between about 5 and about 40 hours. Generally, the polymerization time is not more than about 96 hours.

The aqueous phase type of polymerization for the above monomers usually requires a suitable promoting agent to effect the polymerization in a reasonable length of time and to produce a polymer of the desired molecular weight. These promoting agents fall in three general classes: promoters, activators, and accelerators. In almost all instances, a promoter must be used. Such promoters comprise the inorganic peroxides. Examples of suitable inorganic peroxides are the water-soluble peroxides, such as the perborates, persulfates, perphosphates, percarbonates, barium peroxide, zinc peroxide, and hydrogen peroxide. Particularly valuable are the water-soluble salts of the peracids, such as sodium, potassium, calcium, barium and ammonium salts of the persulfuric and perphosphoric acids which may be prepared in the conventional manner by electrolytic oxidation of salts of the corresponding oxy acids. Suitable concentration of the promoter lies within the range of 0.003 molar to about 0.1 molar. The exact quantity of promoter will depend upon the monomer, molecular weight of the polymer desired and the particular promoter being employed. For example, in the polymerization of trifluorochloroethylene to produce the solid polymer thereof having an N. S. T. above 220° C., a promoter concentration between about 0.003 and about 0.07 molar, or about 0.01 and about 2.0 percent by weight based on water, is preferred. Generally, promoter concentration does not exceed 0.09 molar.

Promoters are also preferably used in conjunction with an activator. Such activators comprise sodium bisulfite, sodium hydrosulfite, sodium thiosulfate and trimethylamine, and in general any water-soluble reducing agent. These activators are generally employed in concentrations similar to the concentration of promoter employed. Equimolar amounts of promoter and activator are preferred.

Buffering agents may be employed also to obtain optimum pH conditions. For example, when an alkaline pH is desired, buffers such as borax, disodium phosphate, sodium carbonate, ammonium carbonate, and sodium acetate may be used. For an acid pH, acetic acid, propionic acid and monosodium phosphate may be employed. It is preferred to maintain a pH between about 1 and about 4.

It has been found that high yields of polymer may be obtained in relatively short periods of time by the use of water-soluble copper compounds. These water-soluble copper compounds, or accelerators, ionize in water to produce copper ion. The accelerator in its oxidized state is more readily reducible than the promoter and in its reduced state is more readily oxidizable than the activator. Various water-soluble salts of copper may be employed, such as for example copper nitrate, copper sulfate, copper carbonate, copper chloride, etc. A particularly suitable copper salt is copper sulfate. The copper sulfate is dissolved in the aqueous reaction mixture and is present in an amount between about 1 and about 1000 p. p. m. calculated as copper. The concentration of accelerator is given, herein and in the appended claims, in p. p. m. of copper unless specifically stated to be otherwise. In the homo-polymerization of trifluorochloroethylene, it is preferred to use between about 20 and about 200 p. p. m. of a copper salt. At relatively low temperatures between about 100 and about 200 p. p. m. may be used. At higher temperatures the concentration of accelerator is preferably kept between about 20 and about 100 p. p. m. since high temperatures combined with high accelerator concentration tend to produce oils and waxes. The copolymerization of trifluorochloroethylene with other fluorinated olefinic monomers and the polymerization of monomers other than trifluorochloroethylene may require accelerator concentrations as high as 1000 p. p. m.

It is preferred to maintain the water phase substantially free from water-soluble organic compounds, such as alcohols and ketones, since such compounds are inhibitors for the polymerization of trifluorochloroethylene and have a marked adverse effect on the polymerization reaction and on the characteristics of the product produced. The use of purified or distilled water is thus preferred.

In carrying out the process of this invention using an accelerator, the polymerization is effected in a vessel or conduit which is not capable of being attacked by the ingredients employed in the polymerization. Suitable corrosion-resistant materials useful for construction or lining of the reaction vessel or conduit comprise stainless steel, Inconel, Monel, silver, nickel, glass or fluorinated solid polymers. In all cases, the liquid in the reaction zone must be vigorously agitated to maintain the reactant and promoting agents in intimate contact. The vigorous agitation of the liquid phase of the reactor may be obtained by high speed stirring, such as with small propellers connected by means of a shaft to a high speed electric motor. Forced circulation of the liquid phase through orifices or small diameter conduits is also an effective method for achieving intimate mixing of the reactant, water and promoting agents. In general, any system suitable for obtaining a mechanical emulsion without using detergents will be applicable since, in most instances, detergents are harmful to the polymerization reaction.

It is within the scope of this invention to disperse finely-divided solids in the liquid phase as a suspension for the purpose of forming nuceli for the start of the polymerization. The following are examples of such fillers: various pigments, such as titanium dioxide, carbon black, clays, asbestos, glass fiber, and other relatively inert solids.

A series of polymerization runs were made in order to more clearly show the effect on the yield and the no strength temperature of polymer resulting from variation in temperature and accelerator concentration. These data are presented in the table below. All runs were made using a 16.2 to 1 ratio of water to monomer. The monomer was trifluorochloroethylene and was homopolymerized. 0.074 molar concentration of potassium persulfate and sodium bisulfite were used i. e. equimolar concentration. The concentration of accelerator is given in parts per million of copper sulfate; the equivalent concentration in terms of copper can be readily calculated.

TABLE

| Run No. | Temp., °C. | Time, Hr. | Percent Yield | Percent Day | N. S. T., °C. | Percent $K_2S_2O_8$ Remaining | $CuSO_4$, p. p. m. |
|---|---|---|---|---|---|---|---|
| 1 | 15 | 96 | 8.4 | 2.1 | 300 | 73.0 | 5 |
| 2 | 15 | 96 | 10.2 | 2.5 | 320 | 59.4 | 50 |
| 3 | 20 | 72 | 20.0 | 6.7 | 312 | 78.4 | 50 |
| 4 | 20 | 72 | 22.5 | 7.5 | 321 | 61.5 | 500 |
| 5 | 25 | 48 | 7.25 | 3.62 | | 58.9 | 5 |
| 6 | 25 | 48 | 14.5 | 7.25 | 283 | 70.2 | 50 |
| 7 | 25 | 48 | 18.5 | 9.25 | 279 | 62.2 | 500 |
| 8 | 30 | 48 | 32.5 | 16.3 | 260 | 70.2 | 5 |
| 9 | 30 | 48 | 42.5 | 21.3 | 250 | 56.8 | 500 |
| 10 | 35 | 43 | 77.4 | 43.2 | 240 | 68.9 | 5 |
| 11 | 35 | 43 | 71.8 | 40.1 | 245 | 66.2 | 50 |
| 12 | 35 | 43 | 66.6 | 37.2 | 238 | 51.3 | 500 |
| 13 | 29–38.5 | 16.5 | 25.6 | 37.2 | 249 | 67.6 | 5 |
| 14 | 29–38.5 | 16.5 | 28.4 | 41.3 | 241 | | 50 |
| 15 | 29–38.5 | 16.5 | 29.2 | 42.5 | 242 | 56.8 | 500 |

Figure 3:
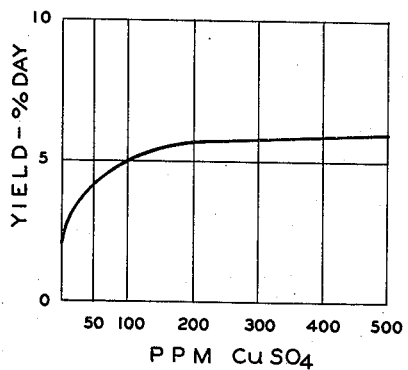
Figure 2:
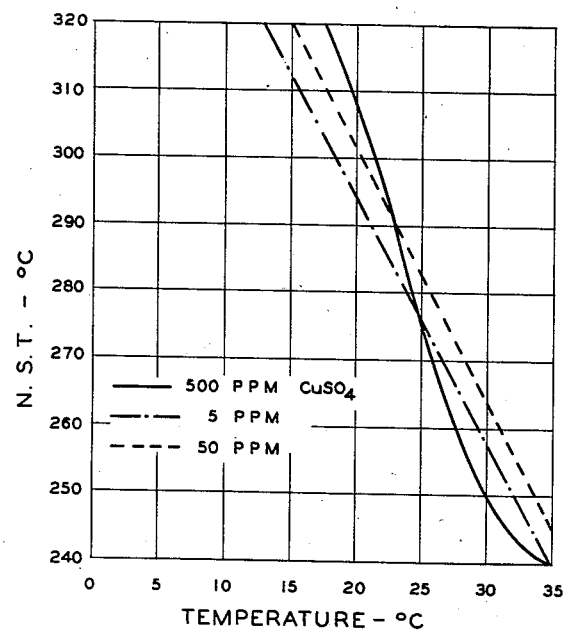

Figures 1, 2 and 3, of the drawing are presented to show the effect of copper sulfate accelerator concentration. Specifically, Figure 1 of the drawing illustrates the effect on the yield of polymer of varying quantities of accelerator with respect to temperature. Figure 2 of the drawing illustrates the N. S. T. of produced polymer with respect to temperature using three different accelerator concentrations. Figure 3 of the drawing illustrates the effect upon yield of polymer of varying concentrations of accelerator. From the drawings, the following conclusions may be drawn. First, the use of a copper accelerator increases the yield of polymer at least twice that of polymer produced in a non-accelerated system. Second, the use of a copper accelerator facilitates the production of high N. S. T. polymer and permits conducting operations near room temperature. The use of accelerator concentration in excess of 200 p. p. m., as copper sulfate, (about 80 p. p. m. as copper) at a temperature of about 20° C. does not significantly increase the yield of polymer. Optimum accelerator concentration will vary with the polymerization temperature. From the data presented in the figures of the drawing and in the table, optimum operating conditions for any given system may be established.

Various modifications and alterations of the procedures of this invention, which will be obvious to those skilled in the art, may be made without departing from the scope of this invention.

Having thus described our invention, we claim:

1. A process for the production of a normally solid fluorine-containing polymer which comprises polymerizing a substituted ethylene compound having at least 2 fluorine atoms in the molecule at a temperature above 0° C. and below 40° C. in the presence of an aqueous-suspension medium containing a water-soluble inorganic peroxide as a promoter, a water-soluble reducing agent selected from the group consisting of alkali bisulfites, alkali hydrosulfites, alkali thiosulfates and trimethylamine as an activator and an amount of a water-soluble salt of copper as an accelator within a range between about 1 and about 1000 p. p. m. calculated as copper.

2. The process of claim 1 in which the substituted ethylene compound is trifluorochloroethylene.

3. The process of claim 1 in which the substituted ethylene is difluorodichloroethylene.

4. The process of claim 1 in which the substituted ethylene compound is trifluorochloroethylene and is copolymerized with vinylidene fluoride.

5. The process of claim 1 in which the substituted ethylene compound is trifluorochloroethylene and is copolymerized with tetrafluoroethylene.

6. The process of claim 1 in which the substituted ethylene compound is trifluorochloroethylene and is copolymerized with trifluoroethylene.

7. A process for the production of a thermoplastic polymer of trifluorochloroethylene which comprises polymerizing trifluorochloroethylene in a polymerization zone at a temperature above about 0° C. and below 40° C. in the presence of an aqueous-suspension medium containing an alkali persulfate as a promoter and an alkali bisulfate as an activator and a water-soluble salt of copper as an accelerator, said water-soluble salt of copper being present in an amount between about 20 and about 200 p. p. m. calculated as copper.

8. A process for the production of a thermoplastic polymer of trifluorochloroethylene having an N. S. T. above about 220° C. which comprises polymerizing trifluorochloroethylene in a polymerization zone at a temperature above about 0° C. and below 40° C. in the presence of an aqueous-suspension medium containing at least about 0.003 molar concentration of potassium persulfate as a promoter and sodium bisulfate as an activator and between about 20 and about 200 p. p. m. of copper sulfate calculated as copper as an accelerator.

9. A process for the production of a thermoplastic polymer of trifluorochloroethylene having an N. S. T. above about 220° C. which comprises homopolymerizing trifluorochloroethylene in a polymerization zone at a temperature between about 15° C. and about 30° C. for a period of time between about 24 and about 72 hours in an aqueous-suspension medium containing approximately equimolar quantities of potassium persulfate as a promoter and sodium bisulfite as an activator and between about 20 and about 200 p. p. m. of copper sulfate calculated as copper.

10. A process for the production of a thermoplastic polymer of trifluorochloroethylene which comprises polymerizing trifluorochloroethylene in a polymerization zone at a temperature above about 0° C. and below 40° C. for a period of time between about 24 hours and about 72 hours in an aqueous-suspension medium containing at least 0.003 molar concentration of potassium perborate as a promoter and sodium thiosulfate as an activator and between about 20 and about 200 p. p. m. of copper nitrate calculated as copper and maintaining the pH of the aqueous-suspension medium between about 1 and about 4.

11. A process for the production of a thermoplastic polymer of trifluorochloroethylene which comprises polymerizing trifluorochloroethylene in a polymerization zone at a temperature above about 0° C. and below 40° C. for a period of time between about 24 and about 72 hours in an aqueous-suspension medium containing approximately equimolar quantities of barium peroxide as a promoter and sodium hydrosulfate as an activator and between about 20 and about 200 p. p. m. of copper chloride calculated as copper and maintaining the quantity of water between about 0.05 and about 10 times by volume the volume of monomer.

12. A process for the production of a thermoplastic polymer of trifluorochloroethylene having an N. S. T. above about 220° C. which comprises homopolymerizing trifluorochloroethylene in a polymerization zone at a temperature above about 0° C. and below 40° C. for a period of time between about 24 and about 72 hours in an aqueous-suspension medium containing at least 0.003 molar concentration of hydrogen peroxide as a promoter and trimethylamine as an activator in approximately equimolar quantities and between about 20 and about 200 p. p. m. of copper sulfate calculated as copper and maintaining the pH of the aqueous-suspension medium between about 1 and about 4, and the quantity of the aqueous-suspension medium between about 0.05 and about 10 times by volume the volume of monomer.

13. A process for the production of a thermoplastic polymer of trifluorochloroethylene which comprises polymerizing trifluorochloroethylene in a polymerization zone at a temperature between about 15° C. and about 25° C. in the presence of an aqueous-suspension medium containing between about 0.03 and about 0.07 molar concentration of an alkali persulfate as a promoter and of an alkali bisulfate as an activator and a water-soluble salt of copper as an accelerator, said water-soluble salt of copper being present in an amount between about 20 and about 200 p. p. m. calculated as copper.

References Cited in the file of this patent
UNITED STATES PATENTS

| | | |
|---|---|---|
| 2,379,431 | Fryling | July 3, 1945 |
| 2,498,226 | Sully | Feb. 21, 1950 |
| 2,569,524 | Hamilton | Oct. 2, 1951 |
| 2,613,202 | Roedel | Oct. 7, 1952 |

U. S. DEPARTMENT OF COMMERCE
PATENT OFFICE

CERTIFICATE OF CORRECTION

Patent No. 2,820,026                                January 14, 1958

Herbert J. Passino et al.

It is hereby certified that error appears in the printed specification of the above numbered patent requiring correction and that the said Letters Patent should read as corrected below.

Column 6, lines 21 and 22 and line 33, and column 8, line 3, for "bisulfate" read -- bisulfite --, in each occurrence.

Signed and sealed this 1st day of April 1958.

(SEAL)
Attest:
KARL H. AXLINE

Attesting Officer

ROBERT C. WATSON
Commissioner of Patents